United States Patent
Hasan et al.

(10) Patent No.: US 7,639,768 B1
(45) Date of Patent: Dec. 29, 2009

(54) METHOD FOR IMPROVING PERFORMANCE IN A MOBILE DEVICE

(75) Inventors: Qamrul Hasan, Sunnyvale, CA (US);
Jeremy Mah, San Jose, CA (US);
Stephan Rosner, Campbell, CA (US)

(73) Assignee: Spansion LLC, Sunnyvale, CA (US)

( * ) Notice: Subject to any disclaimer, the term of this patent is extended or adjusted under 35 U.S.C. 154(b) by 589 days.

(21) Appl. No.: 11/414,845

(22) Filed: May 1, 2006

(51) Int. Cl.
*H04L 7/00* (2006.01)
*H04L 25/00* (2006.01)
*H04L 25/40* (2006.01)

(52) U.S. Cl. .................. 375/372; 375/354; 375/257; 712/32; 345/535

(58) Field of Classification Search .................. 375/372, 375/354, 257; 712/32; 345/535
See application file for complete search history.

(56) References Cited

U.S. PATENT DOCUMENTS 5,870,621 A * 2/1999 Walsh et al. .................. 712/32
6,977,656 B1 * 12/2005 Lee ............................. 345/535

* cited by examiner

*Primary Examiner*—Phuong Phu (57) ABSTRACT

In the operation of a mobile device (such as a cellular telephone or a PDA, i.e. Personal Digital Assistant), which mobile device includes a mobile terminal and a memory module, certain operational signals of the mobile device are multiplexed and demultiplexed, resulting in efficient device bus utilization and reduced device pin count.

15 Claims, 12 Drawing Sheets

| Dynamic | Definition | Static | Definition | Multiplexed? |
|---|---|---|---|---|
| clk | clock | clk | clock | Yes |
| cs_n | channel Select | cs_n | channel select | No |
| cke | clock Enable | ce | chip enable | Yes |
| ras_n | row access | oe_n | output enable | Yes |
| cas_n | column access | avd | address valid | Yes |
| we_n | write enable | we_n | write enable | Yes |
| dm | data mask | x | x | No |
| ba[n:0] | bank access | wp | write protect | Yes |
| addr | address | addr | address | Yes |
| dq | data | d | data | No |
| dqs | data strobe | x | x | No |
| odt | on die termination | acc | accelerate programming | Yes |
| x | x | rdy_n | data ready | No |
| x | x | lb,ub | low byte, upper byte enable | No |

FIGURE 7

METHOD FOR IMPROVING PERFORMANCE IN A MOBILE DEVICE

BACKGROUND OF THE INVENTION

1. Technical Field

This invention relates generally to electronic mobile devices, and more particularly, to a method for improved performance thereof.

2. Background Art

Recently, the capabilities and advantages of electronic mobile devices such as cellular phones and personal digital assistants (PDA's) have increased substantially. For example, increased performance has been coupled with lower cost, lower power consumption, and smaller size. It will be understood that increased performance, along with other advantages, will be constantly sought.

Figure 1:
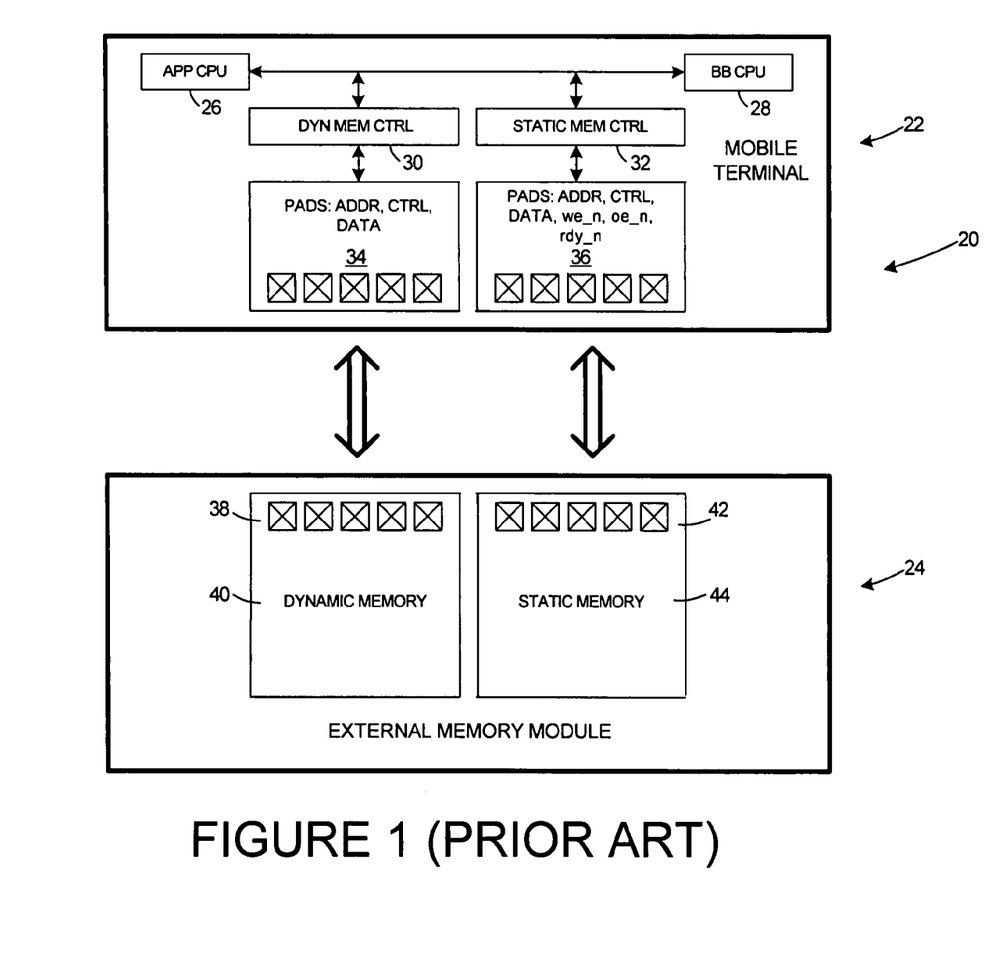
FIG. 1 illustrates a typical mobile device, including a mobile terminal and a memory module.

In a typical mobile device, such as a cellular phone, the mobile device 20 includes a mobile terminal 22 and a memory module 24 (FIG. 1). The mobile terminal 22 is capable of sending signals to the connected memory module 24, and receiving signals from the connected memory module 24. For example, the user of the device 20 may input data to the mobile terminal 22 which sends such data to the connected memory module 24 for storage therein. Also, data in the memory module 24 may be retrieved therefrom to the mobile terminal 22 for the user of the device 20. In furtherance of these objects, in the present example, the mobile terminal 22 includes an application CPU 26, a baseband CPU 28, a dynamic memory controller 30 associated with both CPUs 26, 28, a static memory controller 32 associated with both CPUs 26, 28, a plurality of pads 34 associated with the dynamic memory controller 30, and a plurality of pads 36 associated with the static memory controller 32. The pads 34 associated with the dynamic memory controller 30 contact the pads 38 of a dynamic memory 40 of the external memory module 22, while the pads 36 associated with the static memory controller 32 contact the pads 42 of a static memory 44 of the external memory module 22.

Figure 2:
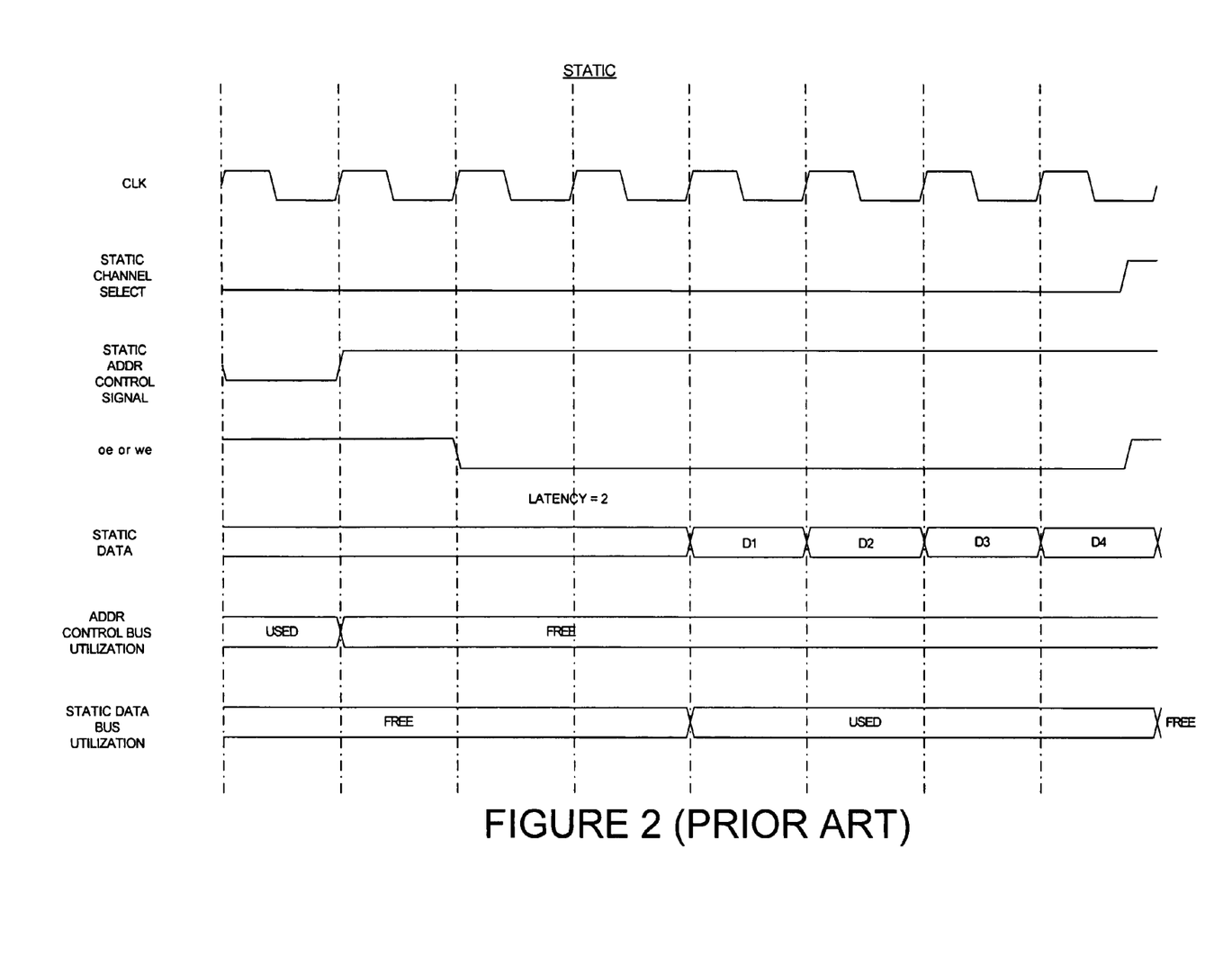
FIG. 2 is a timing diagram illustrating timing of certain signals of the mobile device of FIG. 1.

FIG. 2 illustrates a timing diagram for certain signals related to the static memory. As shown, regular clock cycles are provided by the mobile terminal 22, along with a static channel select signal, a static address control signal, an output enable or write enable signal, and a data output signal (data strings D1, D2, D3, D4 on successive rising clock signals) with latency of two clock cycles after output or write enable. (It will be understood that a number of other operational signals are included, and not illustrated for clarity). Address control bus utilization is shown (corresponding to the timing of the active, low static address control signal), as is the static data bus utilization (corresponding to the timing of data strings D1, D2, D3, D4).

Figure 3:
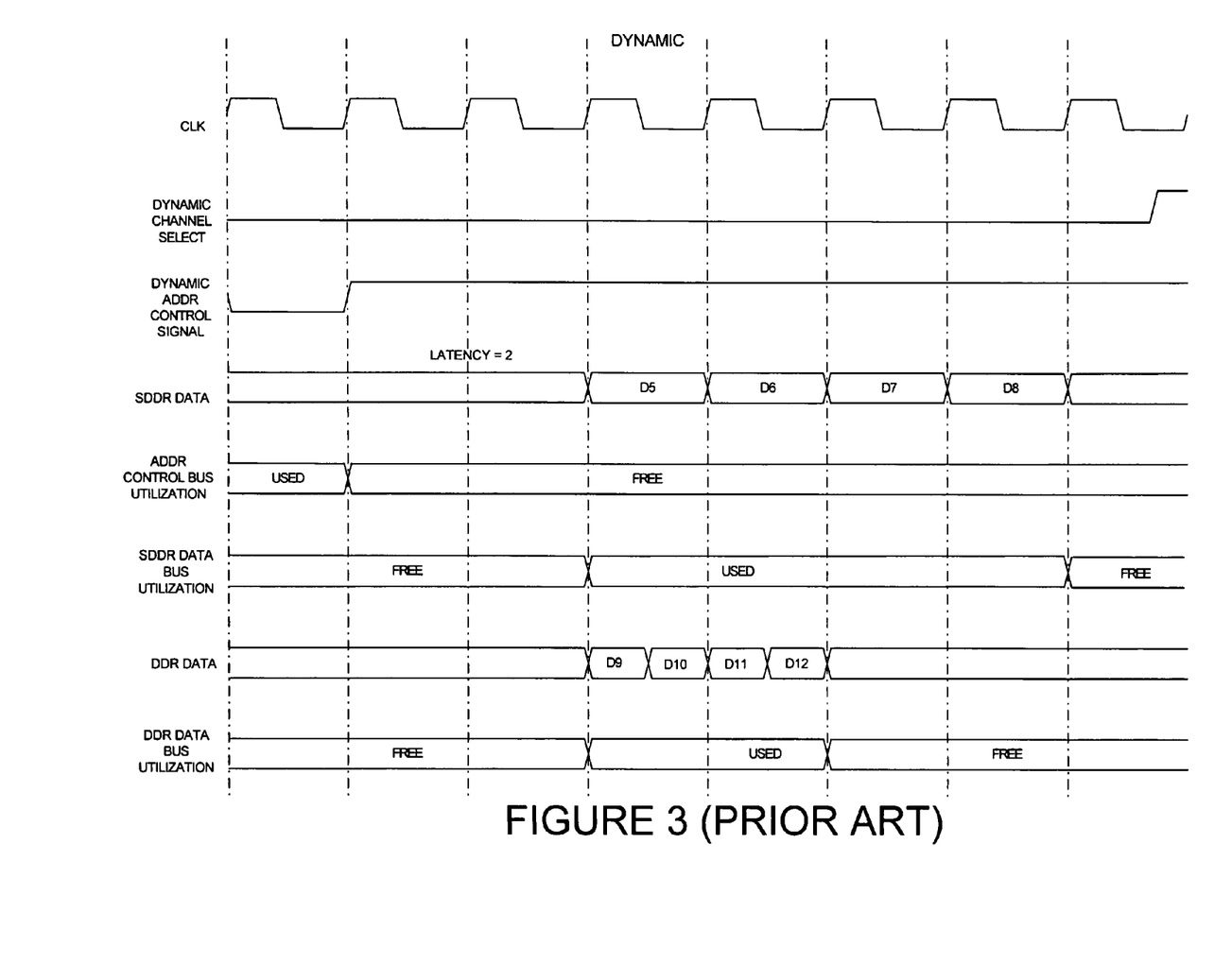
FIG. 3 is a timing diagram illustrating timing of certain other signals of the mobile device of FIG. 1.

FIG. 3 illustrates the timing diagram for certain signals related to the dynamic memory. Again, the regular clock signals are provided by the mobile terminal 22, along with a dynamic channel select signal, a dynamic address control signal, an SDDR (Synchronous Double Data Rate) data output signal (data strings D5, D6, D7, D8 on successive rising edges of the clock signals, with latency of two clock cycles after active, low, dynamic address control signal), and a DDR (Double Data Rate) data output signal (data strings D9, D10, D11, D12 on successive rising and falling edges of the clock signals, with latency of two clock cycles after active, low, dynamic address control signal). SDDR data bus utilization and DDR data bus utilization are also illustrated.

In a typical system, none of these operational signals (i.e., those operational signals illustrated and those operational and signals not illustrated) are multiplexed. In order to increase performance of such a device, the bus width of the mobile terminal 22 would have to be increased, as would device pin count. In addition, in this example, the active dynamic address control signal and active static address control signal occur on the same clock cycle, resulting in the necessity of using separate buses for properly carrying address control signals.

Therefore, what is needed is a method for sending data signals in a mobile device which provides a high-level of operational performance meanwhile reducing pin count and increasing bus utilization.

DISCLOSURE OF THE INVENTION

Broadly stated, in the present method of operation of a mobile terminal, the mobile terminal provides a first set of signals and a second set of signals, the method comprising multiplexing signals of the first set of signals and signals of the second set of signals.

The present invention is better understood upon consideration of the detailed description below, in conjunction with the accompanying drawings. As will become readily apparent to those skilled in the art from the following description, there is shown and described an embodiment of this invention simply by way of the illustration of the best mode to carry out the invention. As will be realized, the invention is capable of other embodiments and its several details are capable of modifications and various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as said preferred mode of use, and further objects and advantages thereof, will best be understood by reference to the following detailed description of an illustrative embodiment when read in conjunction with the accompanying drawings, wherein:

BEST MODE(S) FOR CARRYING OUT THE INVENTION

Reference is now made in detail to a specific embodiment of the present invention which illustrates the best mode presently contemplated by the inventors for practicing the invention.

Figure 4:
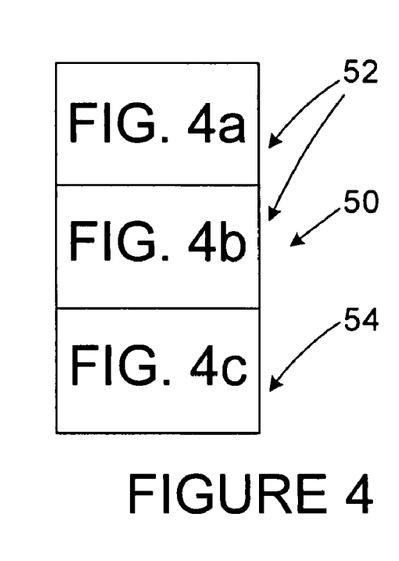
FIG. 4 is an illustration showing the relationship between FIGS. 4a, 4b, and 4c.
Figure 4A:
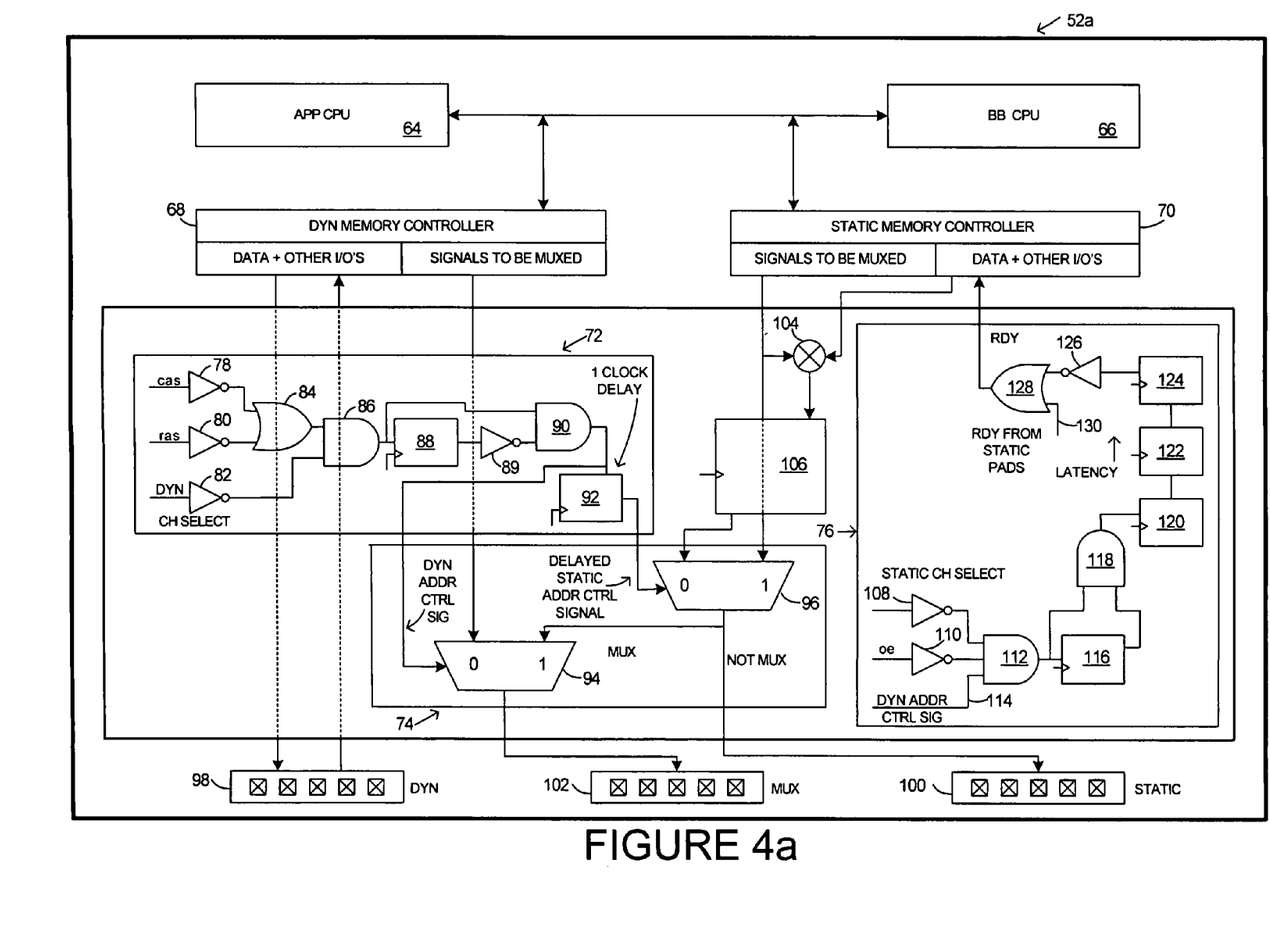
FIG. 4a is a schematic drawing of a portion of the present mobile terminal in a first operation.
Figure 4B:
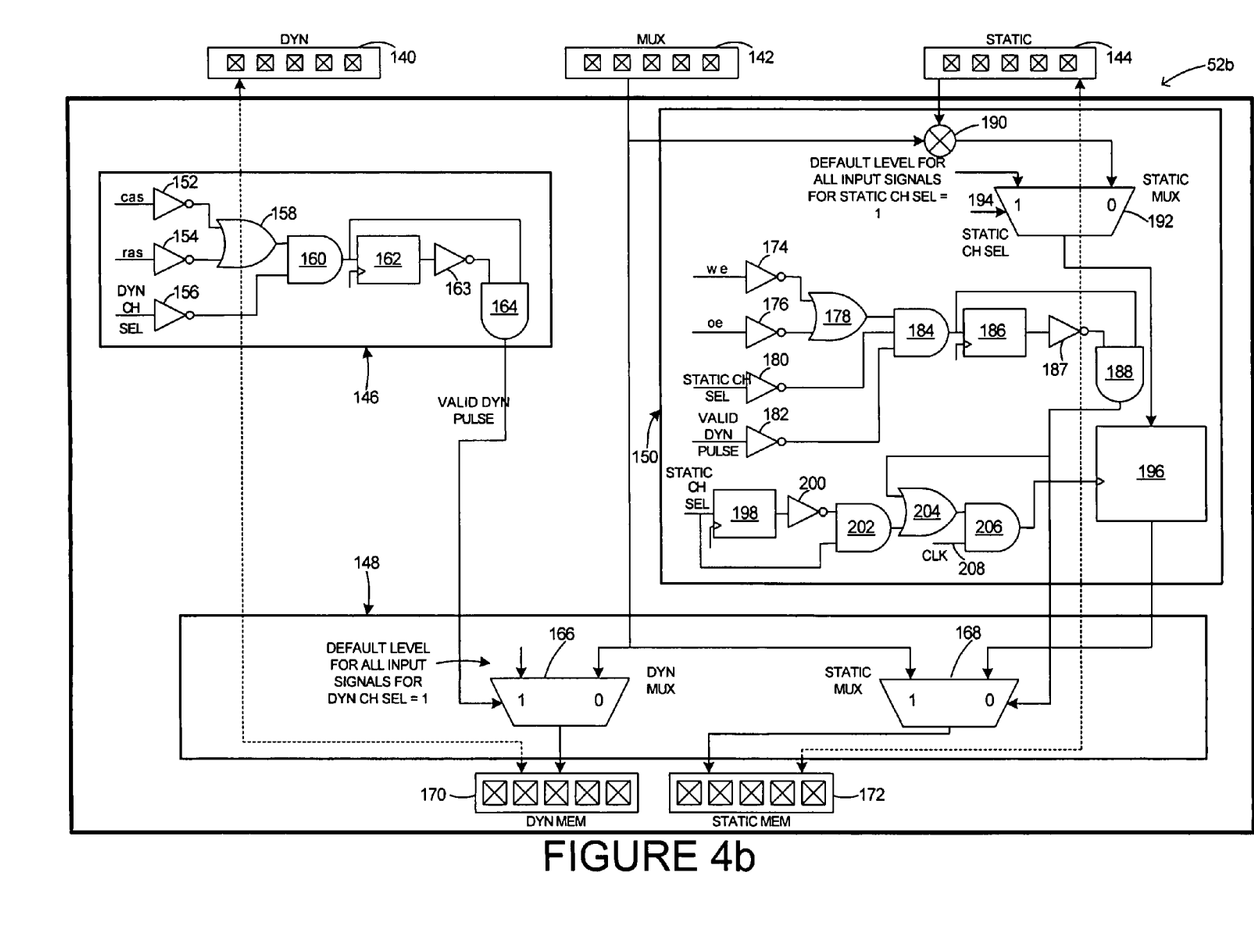
FIG. 4b is a schematic drawing of another portion of the present mobile terminal in the first operation.
Figure 4C:
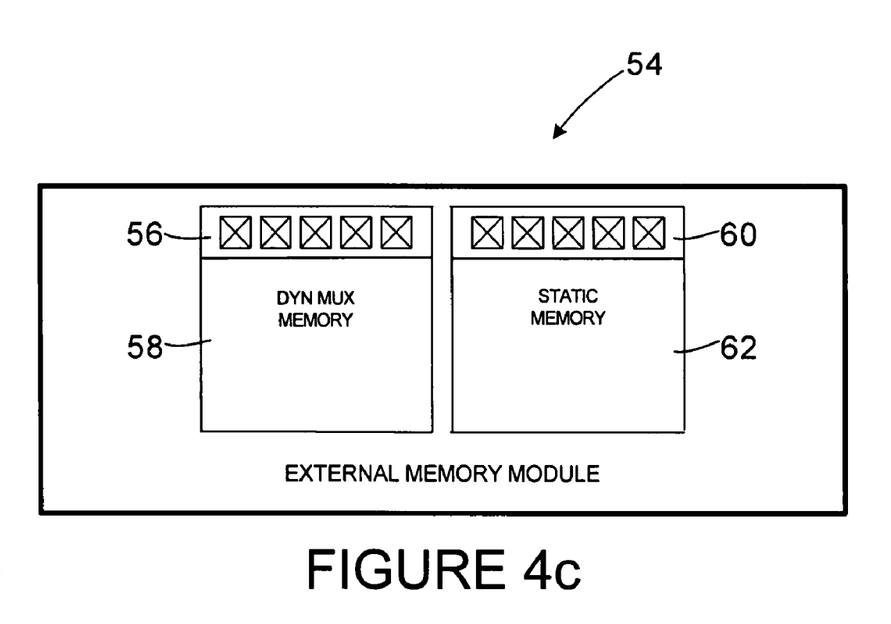
FIG. 4c illustrates the memory module for use with the present mobile terminal as illustrated in FIGS. 4a and 4b.

FIGS. 4a, 4b and 4c illustrate the present mobile device 50, including mobile terminal portions 52a, 52b (FIG. 4a and FIG. 4b), and memory module 54 (FIG. 4c). As will be described, FIG. 4a includes circuitry for providing multiplexing of certain signals within the mobile terminal portion 52a, while FIG. 4b includes circuitry for providing demultiplexing of those multiplexed signals. The memory module 54 of FIG. 4c is similar to that shown in FIG. 3, including contact pads 56 of a dynamic memory 58 and contact pads 60 of a static memory 62.

Referring to FIG. 4a, the mobile terminal portion 52a of the mobile terminal 52, similar to the mobile terminal 22 of FIG. 1, includes an application CPU 64, a baseband CPU 66, a dynamic memory controller 68 associated with both CPUs 64, 66, and a static memory controller 70 associated with both CPUs 64, 66. Included within the mobile terminal portion 52a are host logic modules 72, 74, 76. The host logic module 72 includes inverters 78, 80, 82 which receive signals from the dynamic memory controller 68. The outputs of the inverters 78 and 80 are provided as inputs to an OR gate 84, while the output of the inverter 82 is provided as an input to an AND gate 86. The output of the OR gate 84 is also provided as an input to the AND gate 86. The output of the AND gate 86 is provided as both an input to a D type flip-flop 88 and an input to an AND gate 90, with the output of the flip-flop 88 also being applied through inverter 89 as an input to the AND gate 90. The output of the AND gate 90 is provided as an input to a D type flip-flop 92.

The host logic module 74 includes multiplexers 94, 96 connected as shown. The dynamic address control signal at the output of AND gate 90 is applied to the select terminal of the multiplexer 94, while the output of the flip-flop 92 is applied to the select terminal of the multiplexer 96. The signals of the dynamic memory controller 68 which are to be multiplexed communicate with one input of the multiplexer 94, while data signals and other input/output signals associated with the dynamic memory controller 68, which are not multiplexed, communicate with dynamic signal pads 98. The output of the other multiplexer 96 communicates with the other input of the multiplexer 94 and with static signal pads 100. The output of the multiplexer 94 communicates with multiplexed signal pads 102. The signals of the static memory controller 70 which are to be multiplexed communicate with one input of the multiplexer 96 and with adder 104, while data signals and other input/output signals associated with the static memory controller 70, which are not multiplexed, communicate with the other input of the multiplexer 96 through adder 104 and a D type flip-flop array 106.

Host logic module 76 is a delay circuit which includes inverters 108, 110 the outputs of which are applied as inputs to an AND gate 112, that AND gate 112 also having an additional input 114. The output of the AND gate 112 is provided as both an input to a D type flip-flop 116 and an input to an AND gate 118, with the output of the flip-flop 116 also being applied as an input to the AND gate 118. The output of the AND gate 118 is provided through successive D type flip-flops 120, 122, 124 to an inverter 126, the output of which is applied as an input to an OR gate 128. Another input 130 is provided to the OR gate 128. The output of the OR gate 128 is provided to the static memory controller 70 for operative association with the data signals and other input/output signals thereof which are not multiplexed.

FIG. 4b illustrates another portion 52b of the present mobile terminal 50. The dynamic signal pads 140, multiplexed signal pads 142, and static signal pads 144 thereof connect and communicate with the dynamic signal pads 98, multiplexed signal pads 102, and static signal pads 100 of the mobile terminal portion 52a respectively. The mobile terminal portion 52b includes memory logic modules 146, 148, 150. The memory logic module 146 includes inverters 152, 154, 156 which receive signals from the dynamic memory controller 68. The outputs of the inverters 152, 154 are provided as inputs to an OR gate 158, while the output of the inverter 156 is provided as an input to an AND gate 160. The output of the OR gate 158 is also provided as an input to the AND gate 160. The output of the AND gate 160 is provided as both an input to a D type flip-flop 162 and an input to an AND gate 164, with the output of the flip-flop 162 also being applied through an inverter 163 as an input to the AND gate 164.

The memory logic module 148 includes multiplexers 166, 168 connected as shown. The output of the AND gate 164 is applied to the select terminal of the multiplexer 166. The multiplexed signal pads 142 connect to one input of the multiplexer 166, while the other input to the multiplexer 166 has applied thereto a default level signal. The multiplexed signal pads 142 also connect to one input of the multiplexer 168, while the other input to the multiplexer 168 connects to the memory logic module 150 in a manner which will be described. The output of the multiplexer 166, and the dynamic signal pads 140, connect to dynamic memory pads 170, while the output of the multiplexer 168, and the static signal pads 144, connect to the static memory pads 172.

The memory logic module 150 includes inverters 174, 176, the outputs of which are applied as inputs to an OR gate 178, while the outputs of other inverters 180, 182 are applied as inputs to an AND gate 184. The output of the OR gate 178 is also applied as an input to the AND gate 184. The output of the AND gate 184 is provided as both the input of a D type flip-flop 186 and the input of an AND gate 188, with the output of the flip-flop 186 also being applied through an inverter 187 as an input to the AND gate 188. The multiplexed signal pads 142 and static signal pads 144 are connected through an adder 190 to one input of a multiplexer 192, while the other input to the multiplexer 192 has applied thereto a default level signal. The output of the multiplexer 192 is applied as an input to a D type flip-flop array 196, the output of which is applied to an input of the multiplexer 168. The output of the AND gate 188 is applied to the select terminal of the multiplexer 168 and an input of an OR gate 198. A D type flip-flop 198 has its output connected through an inverter 200 to an input of an AND gate 202, while the input to the flip-flop 198 is also connected as an input to the AND gate 202. The output of the AND gate 202 is provided as an input to the OR gate 204. The output of the OR gate 204 is applied as an input to an AND gate 206, which has another input 208 thereto. The output of the AND gate 206 is applied as a clock signal to the flip-flop array 196.

The pads 170 contact the pads 56 of a dynamic memory 58 of the external memory module 54, while the pads 172 contact the pads 60 of a static memory 62 of the external memory module 54, as previously described (FIG. 4*c*).

The operation of the present system will be described initially with reference to FIG. 4*a* and to the timing diagram of FIGS. 6*a* and 6*b*. The system is operational upon application of dynamic signals to the inverters, which signals determine operation of the circuitry described.

In the present embodiment (FIG. 4*a*), a low (active) dynamic channel select pulse signal is applied as an input to the inverter 82, while a low (active) signal is applied to either the input (cas, column access) to inverter 78 or the input (ras, row access) to the inverter 80. In such case the output of the AND gate 90 (dynamic address control signal), after one clock delay through flip-flop 88, is a low pulse signal, and the output of the flip-flop 92 (delayed static address control signal), delayed by one clock signal after the output of the AND gate 90 is a low pulse signal. In such state a low pulse signal from the AND gate 90 is applied to the select terminal of the multiplexer 94, and a low pulse signal from the flip-flop 92 is applied to the select terminal of the multiplexer 96, providing a communication path for the dynamic signals to be multiplexed and the multiplexed signal pads 102. In the meantime, as noted above, a direct path is provided between the data and other output input signals not multiplexed, and the dynamic signal pads 98. Meanwhile, the low pulse signal (dynamic address control signal) from the AND gate 90 is applied as an input to the AND gate 112 of module 76, while a high (inactive) static channel select signal is applied as an input to the inverter 108 and a low (active) oe, output enable signal is applied as an input to the inverter 110. This provides a low signal output from the AND gate 112. The flip-flop provides a one clock delay of the signal from the AND gate 118 to the flip-flop 120. The number of flip-flops 120, 122, 124 in series is equal to the number of clock cycles of latency in sending data signals. When the ready signal 130 from the static memory pads 100 is high or the output of the inverter 126 is high the OR gate 128 will send a RDY signal to the static memory controller 70 to provide that the data and other input output signals not multiplexed are provided through the adder 104, through the flip-flop 106 array, through the multiplexer 96 and to the static signal pads 100.

With regard to FIG. 4*b*, illustrating demultiplexing, direct paths are provided between the dynamic signal pads 140 and dynamic memory pads 170, and also between the static signal pads 144 and static memory pads 172. The same signals applied to the inverters 78, 80, 82 of FIG. 4*a* are applied to the inverters 152, 154, 156 of the module 146 of FIG. 4*b*. The valid dynamic pulse signal from AND gate 164, in its low state, is applied to the select terminal of the multiplexer 166, providing a communication path between the multiplexed signal pads 142 and the dynamic memory pads 170. A write enable (we) signal, for example low, is applied as an input signal to the inverter 174, and an output enable (oe) signal, for example high, is applied as an input signal to the inverter 176. Meanwhile, the static channel select signal (high) is applied as an input signal to the inverter 180, while the valid dynamic pulse signal (low) from the AND gate 164 is applied to the input of the inverter 182. With the output of the inverter 180 low, the output of the AND gate 184 is low, and the input to the select terminal of the multiplexer 168 is low. Meanwhile, with the static channel select signal applied to the select terminal 194 of the multiplexer 192 high, the default level signals to the multiplexer 192 are applied to the flip-flop array 196, and multiplexer 168. The (low) signal from the AND gate 188 is applied as an input to the OR gate 204, and the static channel select signal (high) is applied to the input of the flip-flop 198. The output of the AND gate 202 is a single (high) pulse so that the output of the AND gate 206 is a single high pulse which, along with a clock signal applied to the AND gate 206, causes the contents of the flip-flop array 196 to be provided to the multiplexer 168 and to the static memory pads 172. As described above, the static memory pads 172 of the mobile terminal portion 52*b* contact the static memory pads 60 of the external memory module 54, and the dynamic memory pads 170 of the mobile terminal portion 52*b* contact the dynamic memory pads 56 of the external memory module 54 for operational association therewith (FIGS. 4*b* and 4*c*).

The above describes multiplexing and demultiplexing of signals under the control of the dynamic memory controller 68. Multiplexing and demultiplexing of signals under the control of the static memory controller 70 will now be described with reference to FIGS. 5*a*-5*c*.

Figure 5:
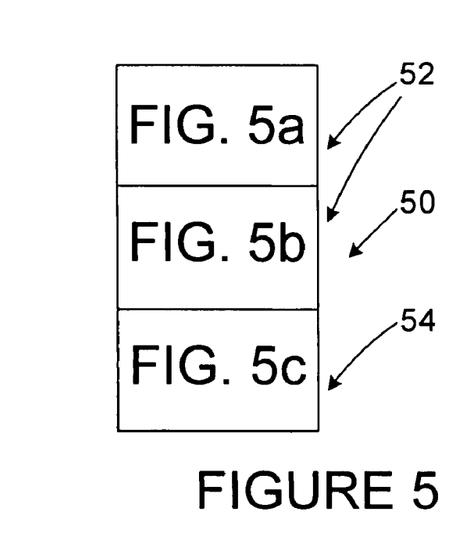
FIG. 5 is an illustration showing the relationship between FIGS. 5a, 5b, and 5c.
Figure 5A:
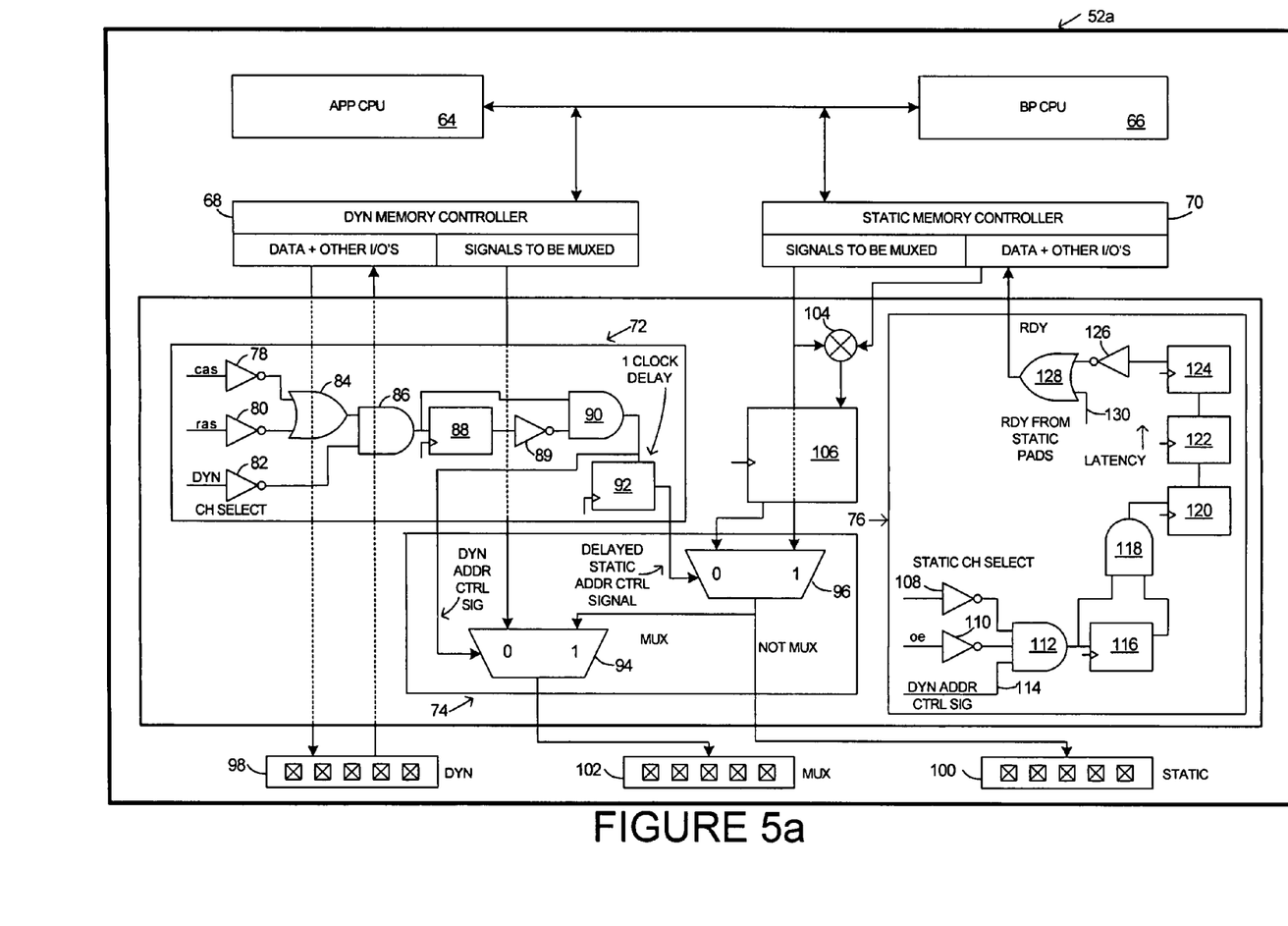
FIG. 5a is a schematic drawing similar to that of FIG. 4a, with the present mobile terminal in a second operation.

Referring to FIG. 5*a*, a high dynamic channel select pulse signal is now applied to the inverter 82. In such case the output of the AND gate 90 (dynamic address control signal), after one clock delay through flip-flop 88, goes high, and the output of the flip-flop 92 (delayed static address control signal), delayed by one clock signal after the output of the AND gate 90 goes high. In such state a high signal is applied to the select terminal of the multiplexer 94, and a high signal is provided to the select terminal of the multiplexer 96, providing a communication path for the static signals to be multiplexed and the multiplexed signal pads 102, through the multiplexer 96 and multiplexer 94. In the meantime, as noted above, a direct path is provided between the data and other output input signals not multiplexed, and the dynamic signal pads 98. Meanwhile, the (high) output (dynamic address control signal) of the AND gate 90 is applied as an input to the AND gate 112 of module 76, while a low static channel select signal is applied as an input to the inverter and a low oe, output enable signal is applied to the input of the inverter 110. This provides a high signal output from the AND gate 112. In such state, and with the ready signal 130 low, the signal from the OR gate 128 will be low, providing that data and other signals under the control of the static memory controller 70 and not multiplexed are not sent.

Figure 5B:
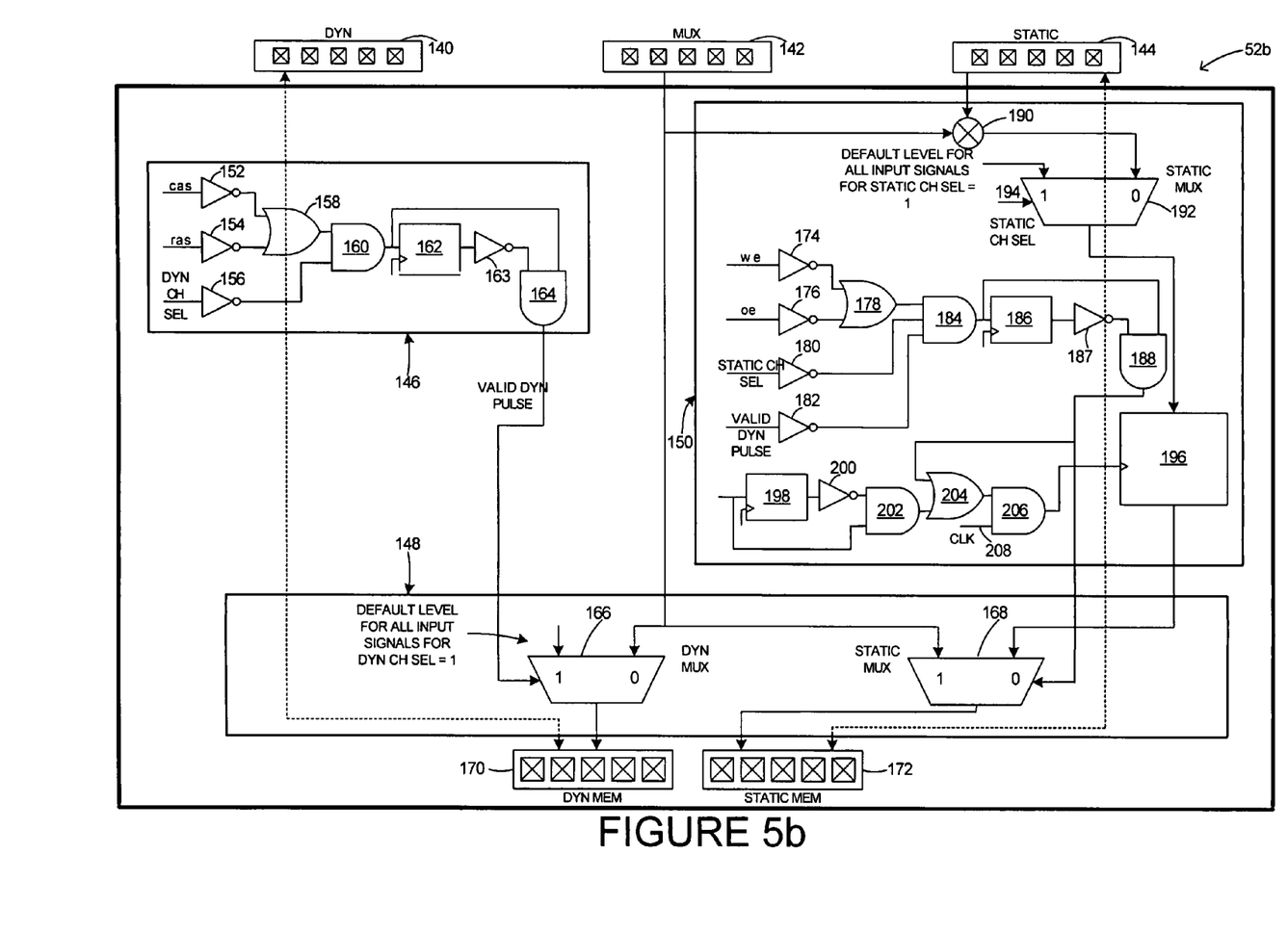
FIG. 5b is a schematic drawing similar to that of FIG. 4b, with the present mobile terminal in the second operation.
Figure 5C:
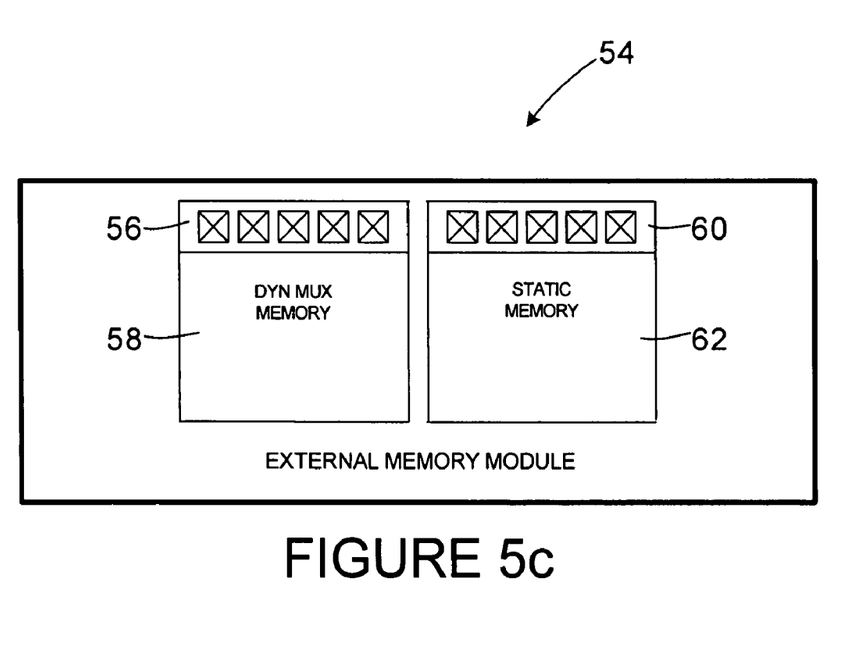
FIG. 5c illustrates the memory module, similar to that of FIG. 4c, for use with the present mobile terminal as illustrated in FIGS. 5a and 5b.

With regard to FIG. 5*b*, illustrating demultiplexing, direct paths are provided between the dynamic signal pads 140 and dynamic memory pads 170, and also between the static signal pads 144 and static memory pads 172. The same signals applied to the inverters 78, 80, 82 of FIG. 5*a* are applied to the inverters 152, 154, 156 of the module 146 of FIG. 5*b*. The valid dynamic pulse signal from AND gate 164, in its high state, is applied to the select terminal of the multiplexer 166, providing application of the default level signal to the dynamic memory pads 170. The same write enable (we), output enable (oe), are applied as inputs to the inverters 174, 176 respectively, and a low static channel select signal is applied as input to the inverter 180 and to the flip-flop 198. Meanwhile, the valid dynamic pulse signal (high) from the AND gate 164 is applied as an input to the inverter 182. With such signals, the output of the AND gate 184 is low, the output of the AND gate 188 is high, and the input to the select terminal of the multiplexer 168 is high, providing a signal path from the multiplexed signal pads 142 through the multiplexer 168 to the static memory pads 172. As described above, the static memory pads 172 of the mobile terminal portion 52*b* contact the static memory pads 60 of the external memory module 54, and the dynamic memory pads 170 of the mobile terminal portion 52*b* contact the dynamic memory pads 56 of the external memory module 54 for operational association therewith (FIGS. 5*b* and 5*c*).

Figures 6, 6B:
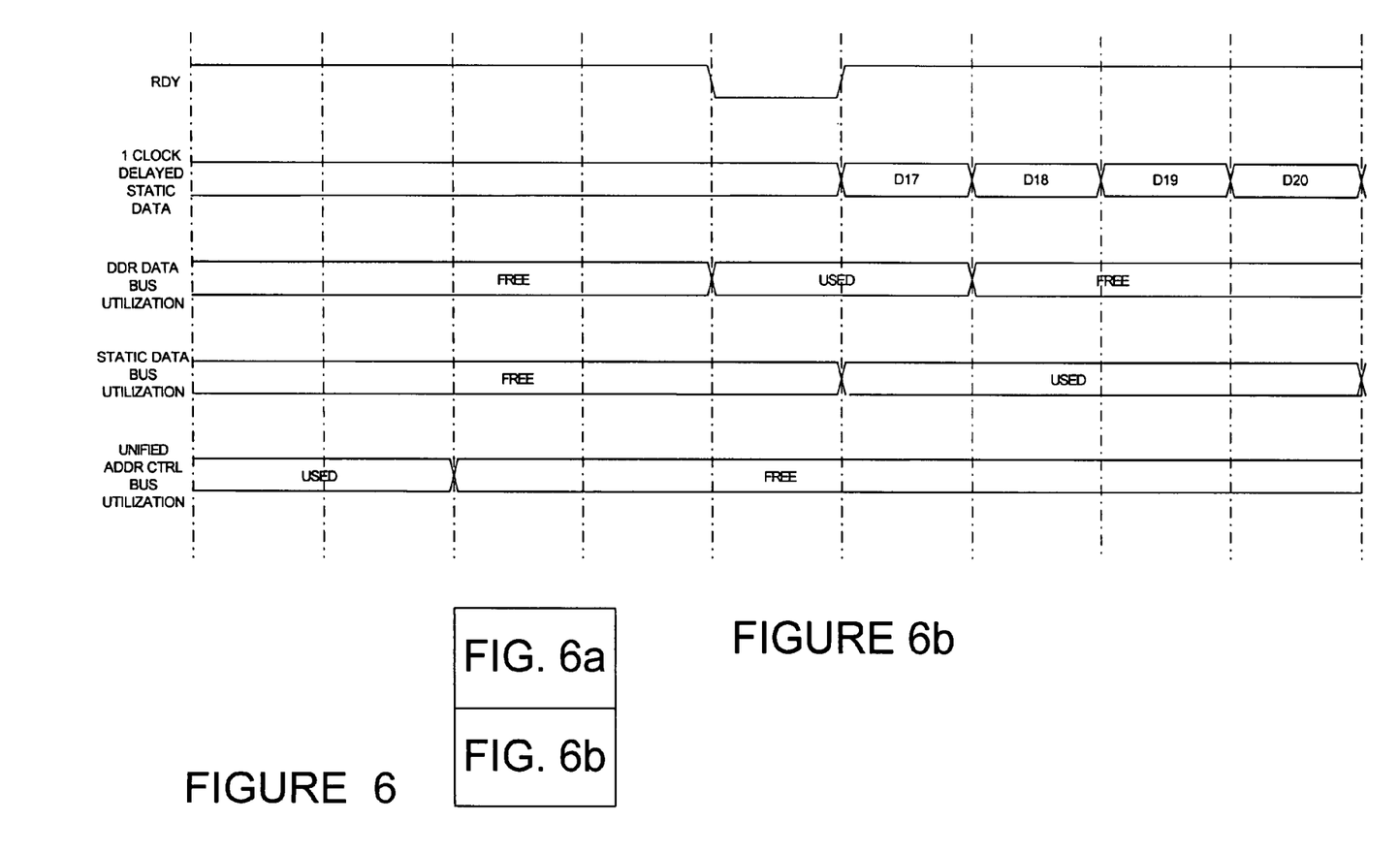
FIG. 6 is an illustration showing the relationship between FIGS. 6a and 6b.
FIGS. 6a and 6b are timing diagrams illustrating timing of certain signals of the present mobile device.
Figure 6A:
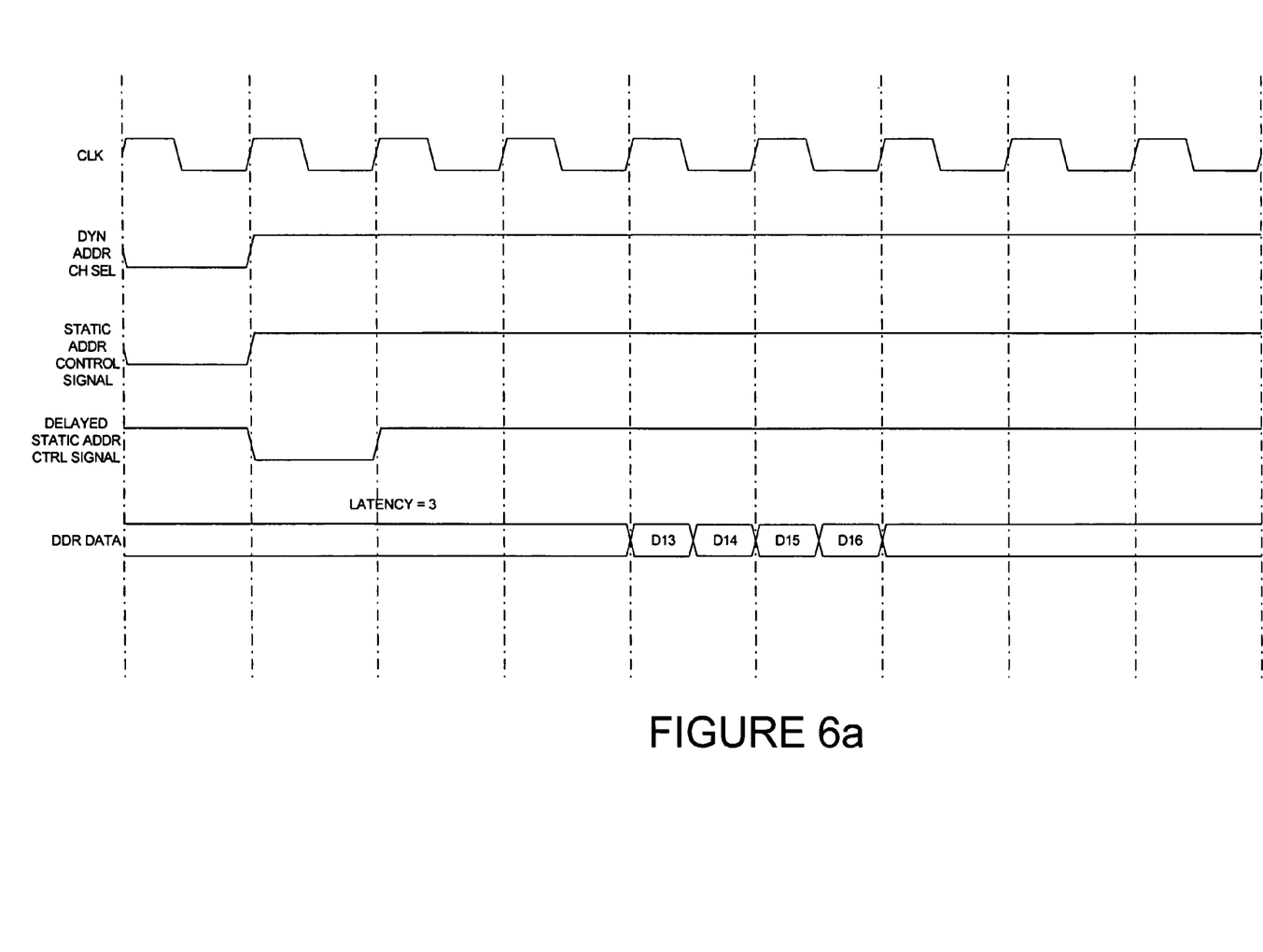

FIG. 6 illustrates the timing of certain signals of the system. As shown and described, FIG. 6 illustrates the timing of the dynamic address control signal, and the delayed static address control signal, one clock later than the dynamic address control signal. It will be remembered that in the prior art, these signals occurred on the same clock cycle, and were transmitted on different buses. The present approach allows one to use a unified, common bus or both the signals in succession, and FIG. 6*b* illustrates the timing for the use of that bus. FIG. 6 also illustrates DDR data output signals D13, D14, D15, D16 and DDR data bus utilization, along with one clock delay static data output signals D17, D18, D19, D20 and static data bus utilization.

Figure 7:
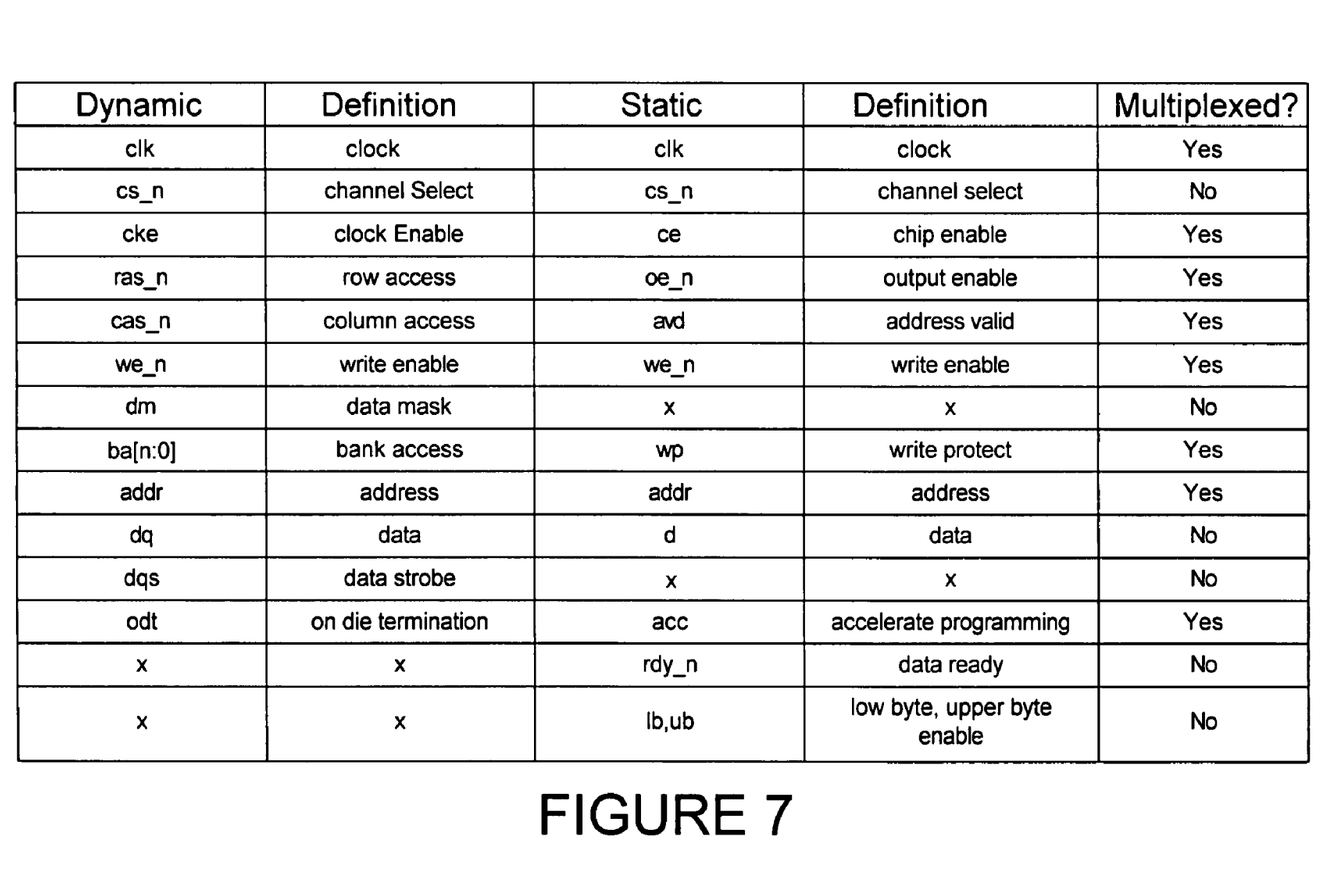
FIG. 7 illustrates the various signals as used in the present mobile device, indicating which signals thereof are multiplexed.

FIG. 7 is a chart specifying those signals of the overall system that are multiplexed and those that are not multiplexed. The multiplexing of certain signals provides for reduction in pin device count, meanwhile achieving high performance.

The foregoing description of the embodiment of the invention has been presented for purposes of illustration and description. It is not intended to be exhaustive or to limit the invention to the precise form disclosed. Other modifications or variations are possible in light of the above teachings.

The embodiment was chosen and described to provide the best illustration of the principles of the invention and its practical application to thereby enable one of ordinary skill of the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of memory access of a mobile terminal for use with a memory module external to the mobile terminal and comprising first and second memories, the method comprising providing a first address control signal for the first memory by means of a first address control signal generator, and a second address control signal for the second memory by means of a second address control signal generator, the first address control signal being capable of first and second states, the second address control signal being capable of first and second states, the respective first states of the first and second address control signals not overlapping in time, wherein the first states of the first and second address control signals provide the mobile terminal operative access of the first and second memories, respectively and the second states of the first and second address control signals prevent mobile terminal operative access of the first and second memories, respectively.

2. The method of claim 1 wherein the respective first states of the first and second address signals are provided on different clock cycles.

3. The method of claim 2 wherein the respective first states of the first and second address control signals are provided on successive clock cycles.

4. The method of claim 1 wherein the first and second address control signals are provided on a common bus.

5. The method of claim 1 wherein the first and second memories are dynamic and static memories respectively.

6. The method of claim 1 wherein the first address control signal is provided to a multiplexer.

7. The method of claim 1 wherein the second address control signal is provided to a multiplexer.

8. The method of claim 1 wherein the first address control signal is provided to a first multiplexer of the mobile terminal, and the second address control signal is provided to a second multiplexer of the mobile terminal.

9. The method of claim 8 wherein the first address control signal is provided to the first multiplexer as select signal, and the second address control signal is provided to the second multiplexer as a select signal.

10. A method of memory access of a mobile terminal for use with a memory module external to the mobile terminal and in operative association therewith, the method comprising providing a plurality of signals by means of signal providing means, and, by means of multiplexing means, multiplexing some of the plurality of signals and not multiplexing others of the plurality of signals, wherein the multiplexing means provides the mobile terminal operative access of a first memory and a second memory of the memory module, wherein the multiplexed signals to the first memory and the multiplexed signals to the second memory do not overlap in time.

11. The method of claim 10 and further comprising demultiplexing the multiplexed signals.

12. The method of claim 10 wherein the multiplexed signals comprise memory control signals.

13. The method of claim 12 wherein the signals not multiplexed comprise data signals.

14. The method of claim 13 wherein the multiplexed signals comprise signals for controlling the first memory and signals for controlling the second memory.

15. The method of claim 14 wherein the signals for controlling the first memory are dynamic memory control signals, and the signals for controlling the second memory are static control signals.

* * * * *